(12) United States Patent
Salati et al.

(10) Patent No.: US 12,538,917 B1
(45) Date of Patent: Feb. 3, 2026

(54) SMART MOUSE TRAP

(71) Applicants: Leonard Salati, Bronx, NY (US);
Fernando Salati, Bronx, NY (US);
Franco Spinelli, Henderson, NV (US)

(72) Inventors: Leonard Salati, Bronx, NY (US);
Fernando Salati, Bronx, NY (US);
Franco Spinelli, Henderson, NV (US)

( * ) Notice: Subject to any disclaimer, the term of this patent is extended or adjusted under 35 U.S.C. 154(b) by 0 days.

(21) Appl. No.: 19/074,342

(22) Filed: Mar. 8, 2025

(51) Int. Cl.
*A01M 31/00* (2006.01)
*A01M 23/00* (2006.01)
*G05B 15/02* (2006.01)

(52) U.S. Cl.
CPC .......... *A01M 31/002* (2013.01); *A01M 23/00* (2013.01); *G05B 15/02* (2013.01)

(58) Field of Classification Search
CPC ............................ A01M 31/002; A01M 31/23
See application file for complete search history.

(56) References Cited

U.S. PATENT DOCUMENTS

| | | | | |
|---|---|---|---|---|
| 2014/0167958 A1* | 6/2014 | Kimchi | ................. | G06F 30/20 340/539.13 |
| 2016/0057395 A1* | 2/2016 | Yuki | ..................... | G06V 40/10 348/222.1 |
| 2020/0253186 A1* | 8/2020 | Files | ..................... | A01M 19/00 |
| 2021/0029983 A1* | 2/2021 | Deering | ............. | A01M 31/002 |
| 2025/0069162 A1* | 2/2025 | Goraya | ................. | G06Q 50/02 |

* cited by examiner

*Primary Examiner* — Wen W Huang
(74) *Attorney, Agent, or Firm* — Edmond DeFrank

(57) ABSTRACT

The embodiments disclose a system for controlling infestation of rodents with a smart mouse trap, including a motion detector configured to activate a camera to capture images when the motion detector detects the rodents close to the smart mouse trap, a thermal imaging device configured to capture thermal images of the rodents, a mobile application configured to scan at least one QR code identifier to determine a location of an area of the smart mouse trap, a pattern recognition processor configured to receive the captured images and analyze and compare the captured images to known rodent behavior patterns for generating matching patterns with insights into rodent habits and interactions and a graphical user interface configured to display an alert to a user when at least one of the rodents are in close proximity to the smart mouse trap and to display eradication recommendations.

20 Claims, 10 Drawing Sheets

SMART MOUSE TRAP

BACKGROUND

Mice are ubiquitous and consume a wide range of food, often contaminating supplies and creating health risks. Controlling their presence has long been a challenge, as they are elusive and their points of entry into buildings can be difficult to locate. Various types of traps have been used for years, yet the persistent nature of mice continues to frustrate efforts to keep them out of food sources.

DETAILED DESCRIPTION OF THE INVENTION

In the following description, reference is made to the accompanying drawings, which form a part hereof, and in which is shown by way of illustration a specific example in which the invention may be practiced. It is to be understood that other embodiments may be utilized and structural changes may be made without departing from the scope of the present invention.

It should be noted that the descriptions that follow, the terms mouse and rodent are interchangeable. Additionally, the following descriptions use a smart mouse trap with various components, including a trap with a feed scent pad system for illustrative purposes only. The present invention is adaptable to various types of mice and rodents with the digitally connected smart application that monitors rodent activity and controls the smart mouse trap. The mouse trap feed scent pad system can be configured to include wireless sensors and can be configured to include ultrasonic sound devices using the present invention.

Figure 1:
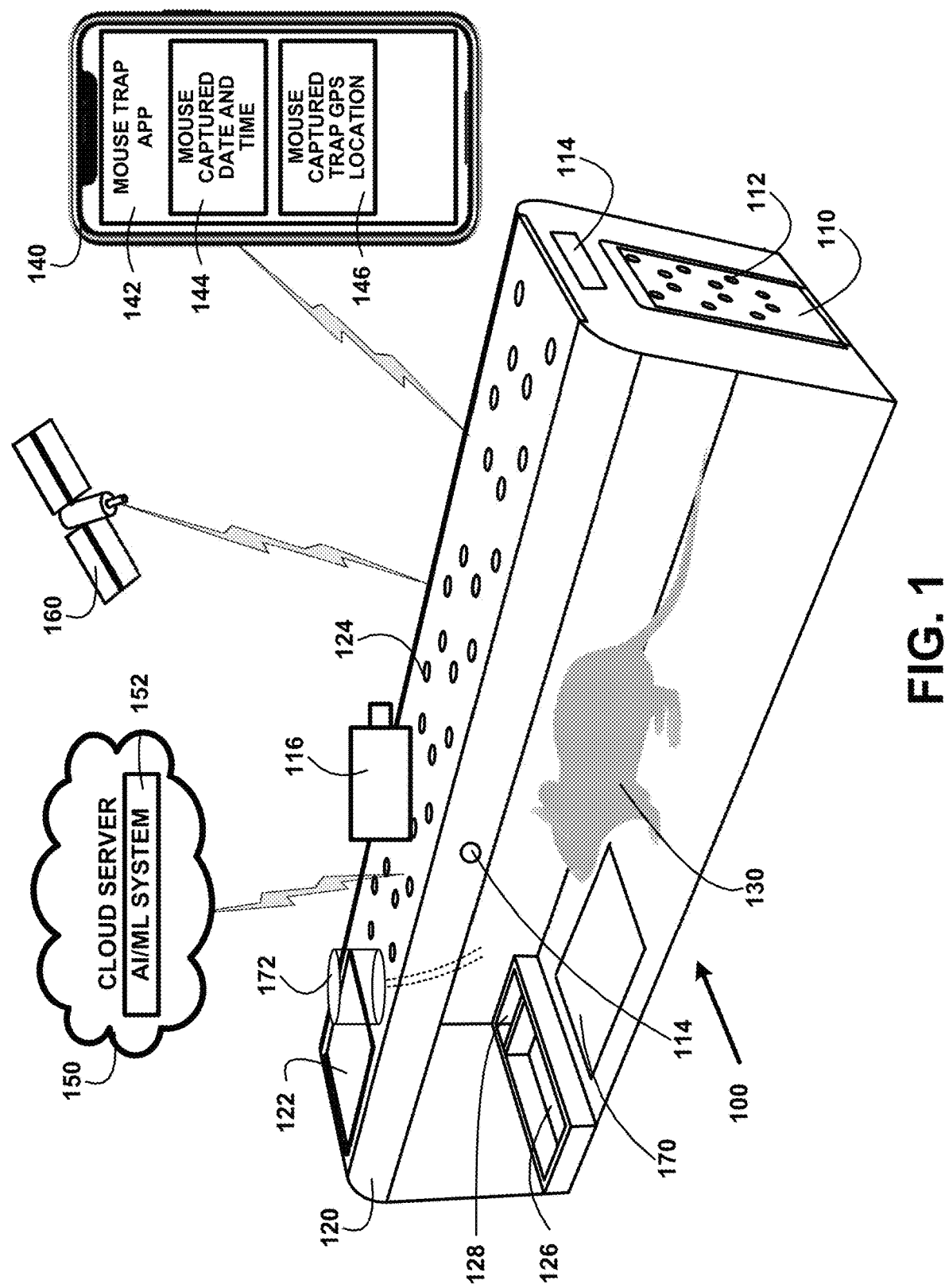
FIG. 1 shows for illustrative purposes only an example of a feed scent pad addition to a mouse trap captured mouse of one embodiment.

FIG. 1 shows for illustrative purposes only an example of a feed scent pad addition to a mouse trap captured mouse of one embodiment. FIG. 1 shows a smart mouse trap 100 to attract mice into a mouse trap. The mouse trap door 110 includes a pressure release device to close the door once a mouse has entered the mouse trap.

The mouse trap door includes breathing holes 112. Sensors 114 are affixed to the mouse trap above the door. The sensors include a proximity sensor to detect the presence of mice near the door. An infrared sensor detects the body heat of a mouse near the door. An ultrasound sensor broadcasts ultrasonic sound mice use to move food to increase their sense of smell near food. The ultrasonic broadcasts will alert real mice that there is food in the location of the trap. A camera 116 mounted on the trap will capture images of mice traffic near the trap including infrared images in low light. The images are recorded in a cloud server 150 and used in an AI/ML system 152 to learn the mice behavioral activities in the area of the mouse trap. This data may determine a potential relocation of the mouse trap to areas of greater mouse traffic.

These sensors can be strategically placed around bait stations or areas where mice are likely to frequent. By continuously monitoring the ambient conditions, the system can provide real-time data to users through a smartphone app or centralized monitoring dashboard. For instance, if the temperature or humidity falls outside the optimal range for mouse 130 activity, users can receive alerts, prompting them to adjust their bait placement or the environment to better suit rodent preferences. Bait monitoring sensor beneath the bait can detect when a mouse is approaching or interacting with it determining what type of bait they might like and dislike. This proactive approach can lead to improved bait consumption rates and higher capture effectiveness, as bait that is in line with the environmental conditions is more likely to attract mice.

Elevation can also play a significant role in the effectiveness of bait placement. Mice tend to navigate through environments based on both horizontal and vertical dimensions. In multi-story buildings or homes, understanding how elevation affects rodent activity can help in optimizing bait locations. For example, mice may prefer lower elevations, such as basements or ground floors, where they feel safer from predators. Elevation data, when combined with temperature and humidity readings, can offer comprehensive insights into the best places to deploy bait, ensuring that traps are set in areas that are most likely to result in successful captures. By leveraging environmental monitoring through temperature, humidity, and elevation data, pest management strategies can become more targeted and effective, leading to better outcomes in controlling rodent populations. Temperature and humidity sensors monitor the environment within the trap resulting in best outcome for rodents attraction and capture.

In addition, temperature, gas, light, and biohazard detection sensors can be used to enhance the functionality of the smart mouse trap 100 by monitoring environmental conditions and identifying potential health risks. Temperature and humidity sensors (such as DHT11, DHT22, or SHT31) help track climate conditions that influence rodent activity. Gas sensors (like $CO_2$, ammonia ($NH_3$), or volatile organic compound (VOC) sensors) detect odors from rodent urine, droppings, or decaying food, helping to locate high-activity areas. Light sensors (such as LDRs or photodiodes) measure ambient light levels, determining when rodents are most active, typically in low-light conditions.

Additionally, the biohazard detection sensors can be integrated to detect harmful viruses and bacteria present in rodent droppings, such as Hantavirus, *Salmonella*, or Leptospira, using airborne pathogen sensors, DNA-based biosensors, or optical fluorescence sensors. These sensors provide an early warning system for dangerous contaminants, improving safety and reducing the risk of disease transmission in infested areas. By integrating the biohazard sensors, the smart mouse trap 100 can monitor and prevent potential health hazards.

The mouse trap 120 includes a feed opening cover 122 the user opens to refill a food tray 126 and a water tray 128 to entice the mice to enter the mouse trap. The top of the mouse trap has a plurality of breathing holes 124. A mouse 130 is captured when they enter the trap door and activate the pressure release device to close the door behind the mouse. Upon capture the door closing activates a signal transmission to the user's mobile device 140 having a mobile app 142. The mobile app 142 records in the cloud server 150 the mouse captured date and time 144 and mouse captured trap GPS location 146. The cloud server 150 processes the capture using the AI/ML system 152. The GPS mouse trap location is received from the GPS satellite 160. The feed scent pad 170 scent is replenished with liquid scents that drip from the scent bottle 172 mounted on the mouse trap above the feed scent pad 170 of one embodiment.

Refined algorithms utilize advanced machine learning techniques to analyze data collected by various sensors, including motion detection sensor 1020, sound sensor 1026, and thermal camera 1032. The thermal imaging camera can detect infrared radiation (heat) from the rodents and convert it into a visible image. The thermal imaging camera can consist of an infrared sensor, a lens to focus heat signals, a processor to generate thermal images, and a display screen. The cameras can detect temperature differences between the rodents and the surrounding area. The thermal cameras can be used to identify the rodents based on their heat signatures near the traps to allow the tracking of the movements of the rodents and their behavior in low-light conditions.

By processing this data in real time, the system can learn to recognize specific patterns associated with rodent behavior while filtering out irrelevant signals. For example, if the system detects a certain frequency or amplitude associated with rodent sounds, it can be programmed to disregard other noises that do not match this profile. This data-driven approach not only enhances the accuracy of detection but also improves the system's ability to adapt to changing environmental conditions.

Tracking powder allows the user to track rodents movements as well as going into contact with the chemical. A preferred chemical is zinc phosphide, which is ingested by the rodent when they groom themselves. Steel wool is a great way to control rodents, place in openings, around pipes, sinks, cracks and crevice areas, etc.

Peanut butter pellets, the user places peanut butter pellets the size of bbs, that can be placed out on the floor and along the wall, staircase, driveway, and other routes leading to the trap. A self-resetting mechanism for after capturing a rodent, the trap automatically resets itself, ready for the next catch. This eliminates the need for resetting the trap. The trap uses low level invisible light to attract rodents. Temperature and humidity sensor monitors the environment within the trap resulting in best outcome for rodents attraction and capture. Synthetic pheromones emitted by the trap that mimic the scent of female mice or other rodents. Peanut butter for baiting rodents as well as bacon also very reliable giving the user options. Seeds including birdseeds, sun flower seeds and other types of seeds are another way of baiting rodents placing them near the trap. Scent trails created using strong smelling substances like peppermint oil or fish oil to guide the rodents towards the trap.

Sensor calibration also plays a vital role in reducing false triggers. This process involves fine-tuning the sensitivity of various sensors to ensure they are appropriately responsive to rodent activity without being overly sensitive to benign disturbances. For instance, motion detection sensors 1020 can be calibrated to ignore small movements, such as those caused by pets or household appliances, while still detecting larger movements indicative of rodent activity. By establishing optimal sensitivity thresholds, the system can maintain a balance between responsiveness and accuracy, thereby significantly reducing the occurrence of false positives.

Implementing diverse trigger mechanisms for mouse trap activation—such as pressure plates, sensors, and photoelectric beams—can significantly improve capture rates and enhance the effectiveness of rodent control strategies. Each of these triggers operates based on different principles of detection, allowing for tailored trap setups depending on the environment and mouse behavior 1010 patterns. By using multiple trigger types, traps can achieve high precision and reliability, effectively responding to even the slightest presence of a mouse 130 near the bait or trap.

Pressure plates are a widely used trigger mechanism in traps, especially for settings where mice are likely to physically engage with a particular surface or bait. When a mouse 130 steps onto the plate, the weight activates the mechanism, setting off the trap. This method is especially effective because it is mechanical and doesn't rely on visibility or line-of-sight, making it ideal for darker or more enclosed spaces. Pressure plate sensitivity can be adjusted to respond to the weight of small animals like mice while ignoring lighter disturbances, reducing false activations and ensuring that the trap is primed for accurate engagement.

Sensors, particularly motion detection sensor 1020 or infrared sensor 1038, provide an added layer of precision for trap activation. Motion detection sensors 1020 detect movement in the surrounding area, while infrared sensor 1038 can detect the body heat of a nearby mouse 130. These sensors are particularly useful in low-light or nighttime conditions, where mice are most active. When a mouse 130 moves into the sensor's detection range, it triggers the trap without the animal needing to make direct contact. This touch-free activation system can be combined with bait to lure the mouse 130 within range, allowing for a more dynamic capture strategy.

Photoelectric beams, on the other hand, create an invisible "trip wire" that, when broken by a passing mouse 130, activates the trap. These beams are especially effective for highly controlled spaces, as they allow for instantaneous detection of movement within a specific path. This method is advantageous in setups where mice are known to frequent particular routes or access points. Photoelectric beams can also be paired with other triggers, such as bait placement or pressure plates, to create a multi-tiered capture system that maximizes the chances of successful trapping by accommodating various behaviors and activity patterns of the target mice.

Integrating smartphone apps with trap monitoring systems that capture video and images of mice can be an effective way to enhance pest control by allowing users to monitor rodent activity directly from their mobile devices. With this setup, miniature cameras positioned around bait stations or traps capture footage of mice interacting with bait, tracking their movement patterns and behavior. This real-time information is sent directly to a smartphone app, providing convenient access to video and images that display exactly when and where mice are present. Users can see footage of the mouse 130 approaching, interacting with, or even avoiding the bait, which can be especially helpful for adjusting trap placement or bait type.

The mobile app interface typically includes features that allow users to view live feeds, as well as stored video clips and images. Some systems use AI to analyze the footage, automatically flagging moments when a mouse 130 is detected, and providing summary data on the frequency of activity, time of day when interactions are highest, and even activity levels around specific bait types. This feature offers a hands-free way to monitor multiple locations at once, alerting users through push notifications whenever a mouse 130 is captured on video. This real-time interaction provides a proactive approach, allowing users to make quick adjustments, such as relocating bait stations or traps, based on the observed behavior.

For pest control professionals, smartphone-based monitoring can enhance service efficiency and customer satisfaction by providing transparent, data-driven insights. The mobile app can generate reports detailing the effectiveness of certain bait types or locations, helping to refine strategies over time. In addition, the data collected through the app, including timestamps and frequency of interactions, can inform predictive modeling on mouse 130 activity patterns. These insights not only improve capture rates but also help identify potential entry points or problem areas within the building. The convenience and immediacy of smartphone integration in pest control systems enable a modern, data-centric approach to managing rodent issues more effectively and sustainably.

Smartphone notifications provide real-time alerts for mouse trap triggers or unusual activity, making pest management significantly more efficient and responsive. When a mouse 130 triggers a trap or approaches a bait station, the system instantly sends a notification to the user's smartphone, allowing for immediate awareness and action. This setup is particularly useful for monitoring hard-to-access areas like basements, attics, or garages, where mouse 130 activity might otherwise go unnoticed. Notifications can detail the location and time of the event, providing users with a clear picture of mouse behavior 1010 and making it easier to adjust strategies, such as repositioning traps or trying different bait types.

Figure 2:
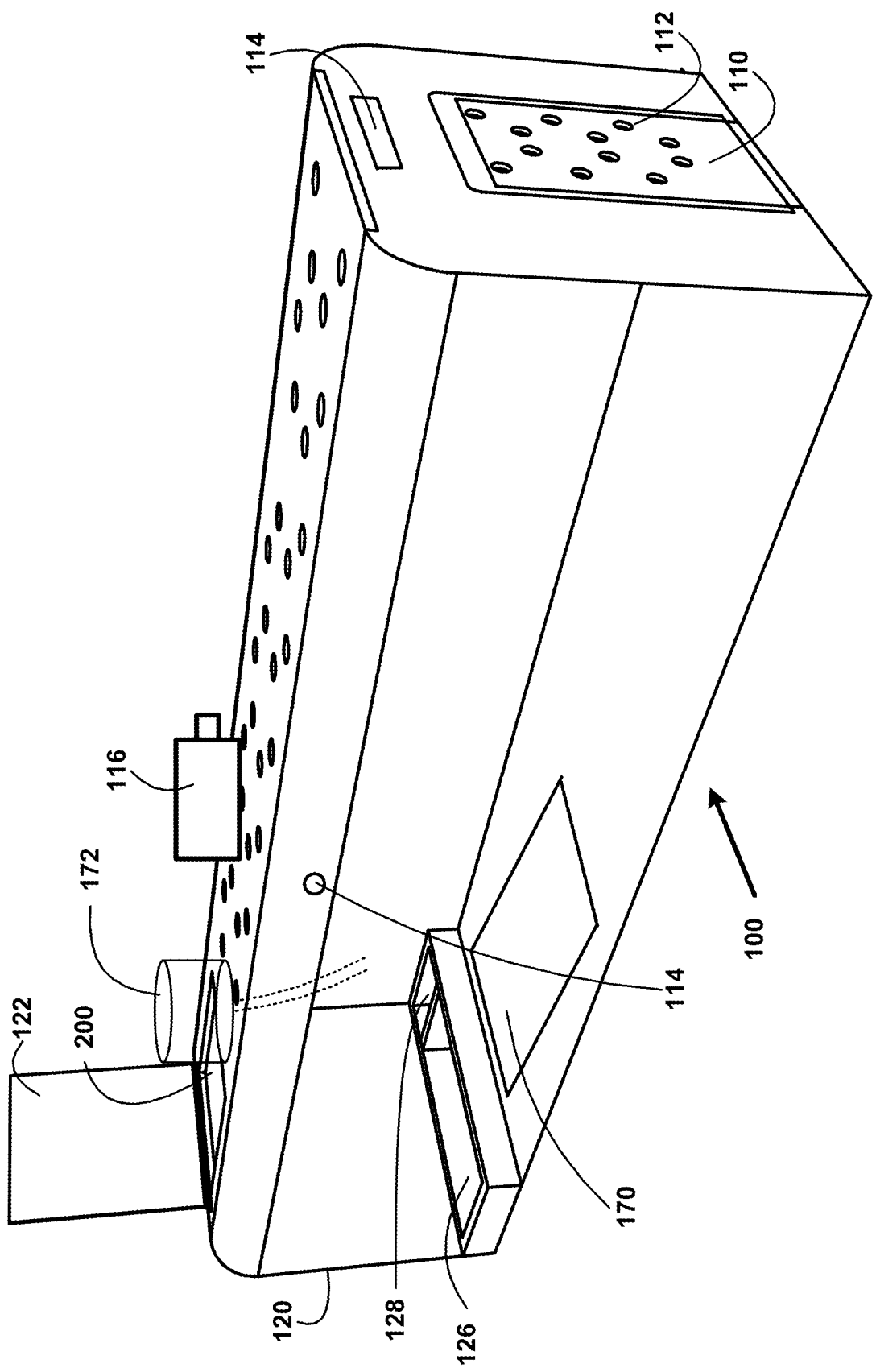
FIG. 2 shows for illustrative purposes only an example of a feed scent pad bottle drops of scents of one embodiment.

FIG. 2 shows for illustrative purposes only an example of a feed scent pad bottle drops of scents of one embodiment. FIG. 2 shows the smart mouse trap 100 with the mouse trap door 110 with breathing holes 112 close during the replenishment of the food and water to the food tray 126 and water tray 128 with the feed opening cover 122 opened feed opening 200. The feed scent pad 170 scent bottle 172 is refilled at the same time and may include the addition of a mating scent to add to the attraction of mice. The sensors 114 and camera 116 mounted on the mouse trap 120 are checked to make sure they are operating properly of one embodiment.

Figure 3:
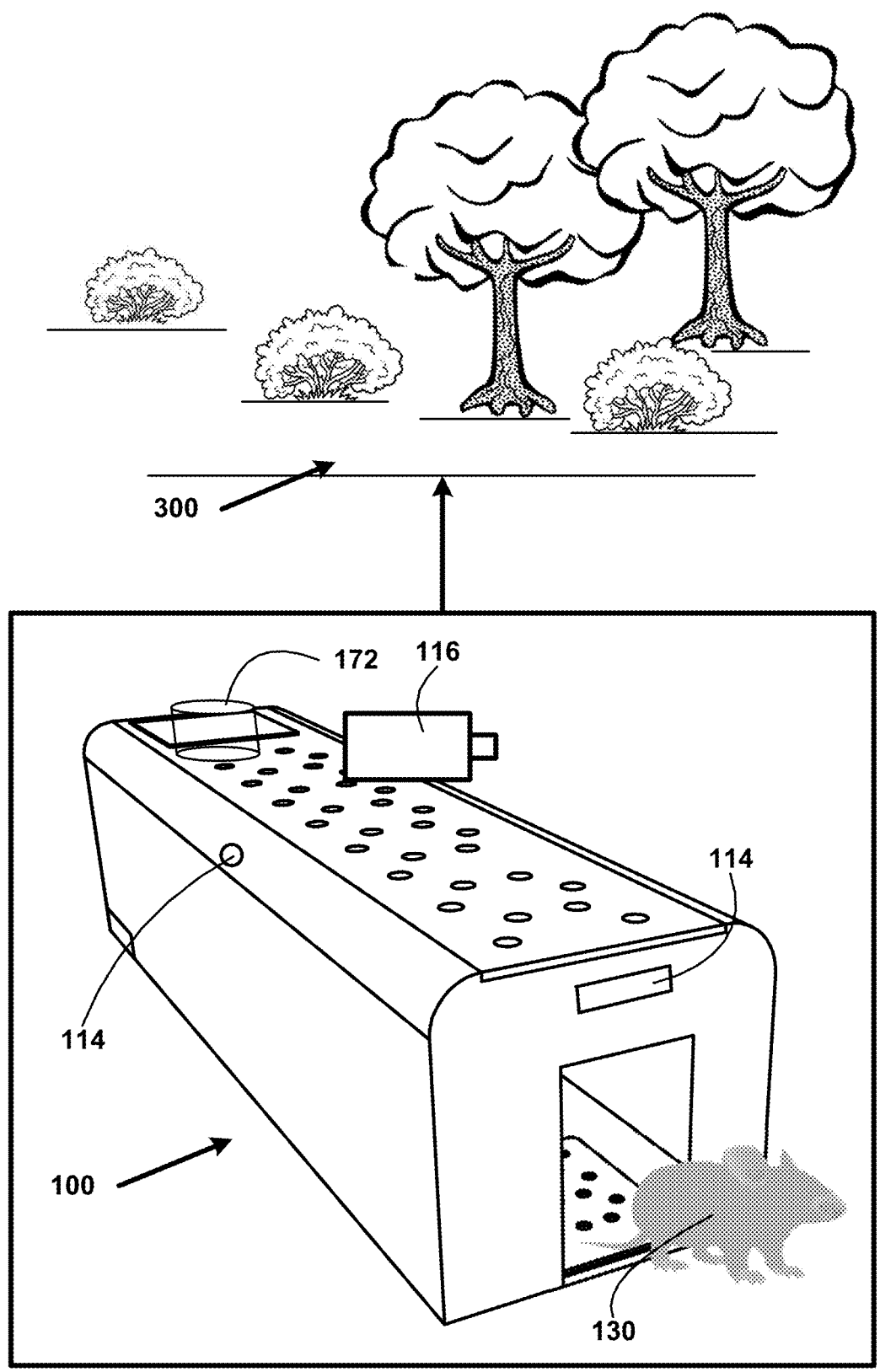
FIG. 3 shows for illustrative purposes only an example of a feed scent pad humane release of mouse of one embodiment.

FIG. 3 shows for illustrative purposes only an example of a feed scent pad humane release of mouse of one embodiment. FIG. 3 shows the humane release of a mouse 130 from the smart mouse trap 100. Shown on the smart mouse trap 100 are the camera 116 and the scent bottle 172. The smart mouse trap 100 is moved outdoors 300 away from the house or building to release the mouse 130 in a humane manner of one embodiment.

Figure 4:
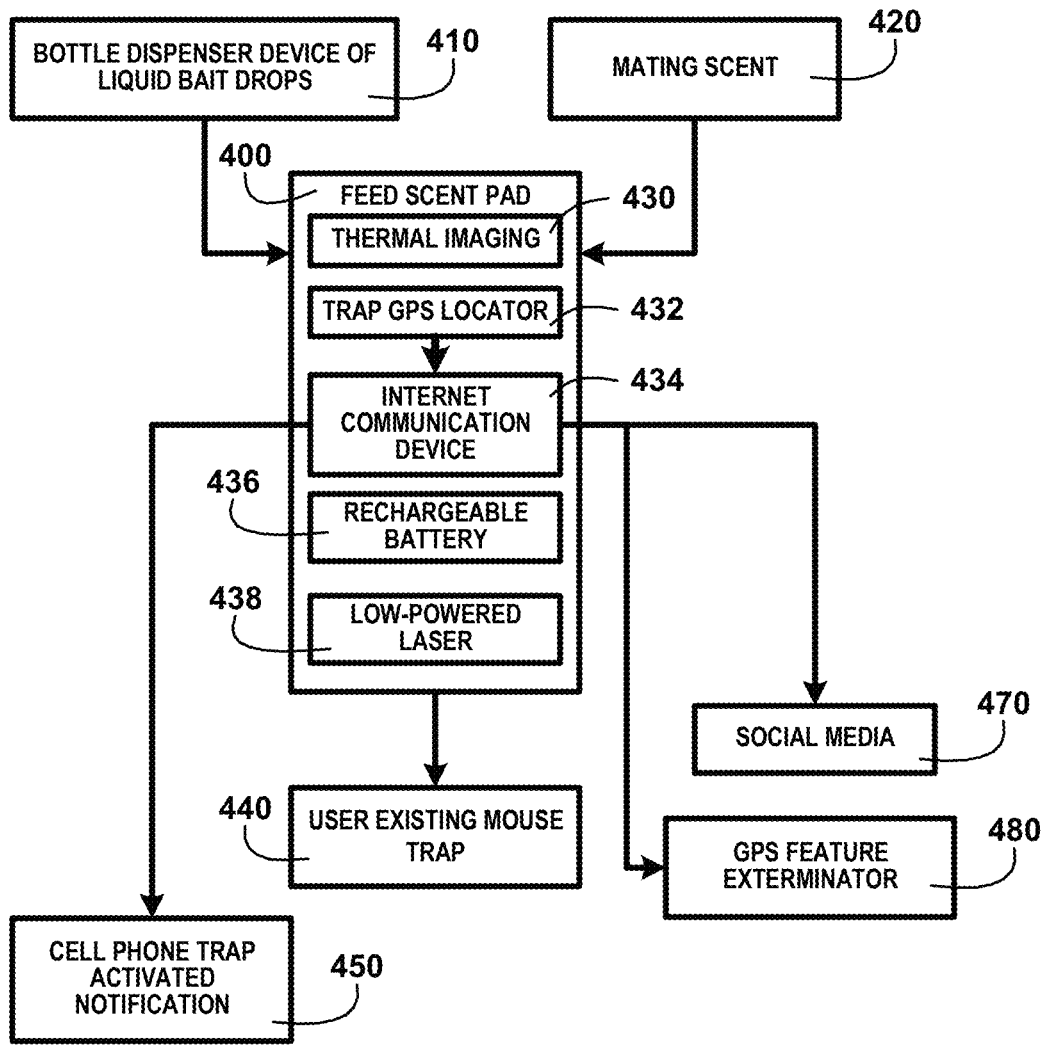
FIG. 4 shows a block diagram of an overview of a feed scent pad addition to a mouse trap of one embodiment.

FIG. 4 shows a block diagram of an overview of a feed scent pad addition to a mouse trap of one embodiment. FIG. 4 shows a feed scent pad 400 with a bottle dispenser device of liquid bait drops 410 and mating scent 420 to attract mice. Thermal imaging 430 is used to capture video of low-light mice activities to learn the paths they frequent and possible entrance points to the room or building. The feed scent pad 400 also includes a trap GPS locator 432 to identify the location of the feed scent pad 400.

A low-power laser 438 is used to track the movements of mice via a laser projected grid on a floor. By creating a virtual grid on the floor of the observation area, a user can monitor the exact position and movements of the mice without physically interfering. Low-power lasers emit light that can map the grid invisibly. As mice move through this grid, they disrupt the laser beams, which are detected by sensors. The low-power laser 438 tracking the movements of mice is transmitted to the cloud server 150 and processed in the AI/ML system. The machine learning uses the tracking data to determine favored locations 1016 of the mice. Giving the user alternative locations to place traps. Algorithms utilize advanced machine-learning 152 techniques to analyze data collected by various sensors, including motion detectors, sound sensors, and thermal cameras. By processing this data in real-time, the system can learn to recognize specific patterns associated with rodent behavior while filtering out irrelevant signals. For example, if the system detects a certain frequency or amplitude associated with rodent sounds, it can be programmed to disregard other noises that do not match this profile. This data-driven approach not only enhances the accuracy of detection but also improves the system's ability to adapt to changing environmental conditions.

Utilizing solar power for the operation of a smart mouse trap 100 in remote areas presents a sustainable and efficient solution for managing pest populations without relying on traditional electrical sources. Many rural or isolated locations lack easy access to power infrastructure, making solar energy an ideal alternative. By harnessing the sun's energy, rodent control systems can operate autonomously, ensuring continuous monitoring and management of rodent activity without the need for extensive electrical installations. This approach not only reduces energy costs but also minimizes the environmental impact associated with fossil fuel consumption.

Solar-powered smart mouse trap 100 can incorporate various technologies, such as motion detection sensors 1020, thermal camera 1032, sound sensor 1026 detection, and bait monitoring, all of which can be powered by solar panels. These systems can be designed with energy-efficient components, ensuring that even in low-sunlight conditions, the system maintains functionality. Additionally, incorporating energy storage solutions, such as batteries, allows for the system to operate effectively during cloudy days or at night, providing round-the-clock monitoring of rodent activity. This capability is particularly crucial in remote areas where immediate human intervention may not be feasible, ensuring that the system remains operational and effective at all times.

Implementing solar-powered smart mouse trap 100 system can also be beneficial for agricultural settings or wildlife reserves, where protecting crops or maintaining ecological balance is essential. By reducing reliance on chemical pesticides and providing a continuous monitoring solution, solar-powered systems can help manage rodent populations in a more environmentally friendly manner. Furthermore, this approach can be coupled with data analytics capabilities, where real-time monitoring data is sent to a smartphone mobile app or cloud-based platform. This allows users to remotely assess rodent activity and make informed decisions on control measures, all while minimizing their carbon footprint. In summary, solar power enhances the effectiveness and sustainability of rodent control systems in remote areas, paving the way for innovative pest management solutions.

An internet communication device 434 provides user access to the internet for social media 470 reporting of results with the feed scent pad 400 and a GPS feature exterminator 480 locator. At least one rechargeable battery 436 powers the electrical devices coupled physically and wirelessly to the feed scent pad 400. The feed scent pad 400 is connected to the smart mouse trap 100 of FIG. 1 or a user's existing mouse trap 440. The internet communication device 434 is further used to send cell phone trap-activated notifications 450 to the user's mobile device when the trap is activated by the trapping of a mouse of one embodiment.

Figure 5:
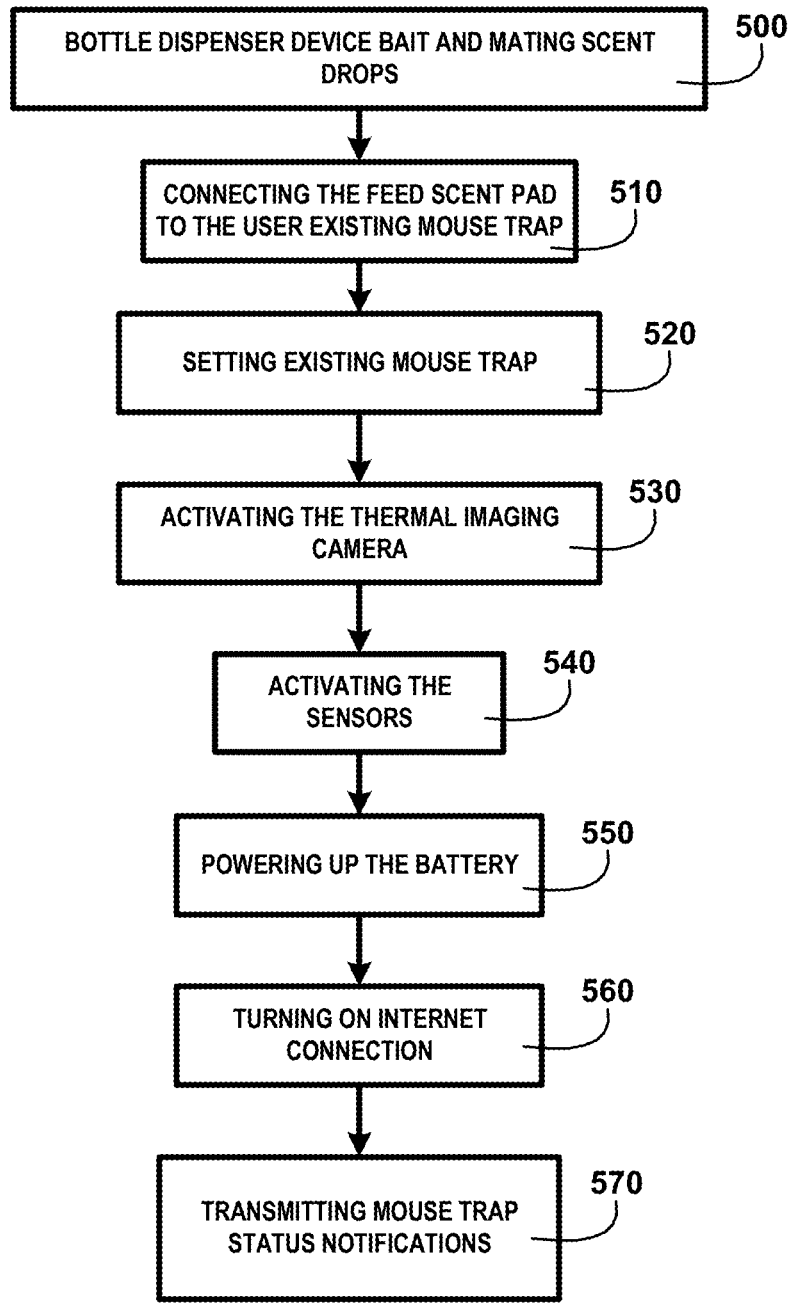
FIG. 5 shows a block diagram of an overview flow chart of a feed scent pad addition of one embodiment.

FIG. 5 shows a block diagram of an overview flow chart of a feed scent pad addition of one embodiment. FIG. 5 shows a bottle dispenser device with peanut butter oil and mating scent drops 500 to start increasing the attraction of mice. Connecting the feed scent pad to the user's existing mouse trap 510 will increase the potential of trapping a mouse by attracting more mice to the trap location. Setting the existing mouse trap 520 after connecting the feed scent pad 400 prepares for success.

Activating the thermal imaging camera 530 allows for capturing video of the mouse activities near the feed scent pad 400, especially in low light conditions. A miniature thermal camera is used for detecting mouse activity, capable of sensing the body heat of mice even when they are partially hidden in walls, behind obstacles, or within enclosed spaces. Unlike conventional cameras, which rely on visible light, thermal cameras capture infrared radiation, emitted as heat, allowing them to pick up the warmth of a mouse's body through thin walls, around corners, or inside boxes. This ability to detect mice in otherwise concealed areas makes thermal cameras highly effective for tracking rodents in environments where they might typically evade detection.

Activating the sensors 540 readies the sensors to detect the presence and proximity of mice and also increases the attractive nature of the feed scent pad 400. Powering up the battery 550 starts the operations of the electrical devices. Turning on internet connection 560 prepares for notifications to be sent to the user when the trap is activated by the trapping of a mouse. Transmitting mouse trap status notifications 570 alerts the user that a mouse has been trapped and resetting the mouse trap at that location will probably repeat the process and results of one embodiment.

Figure 6:
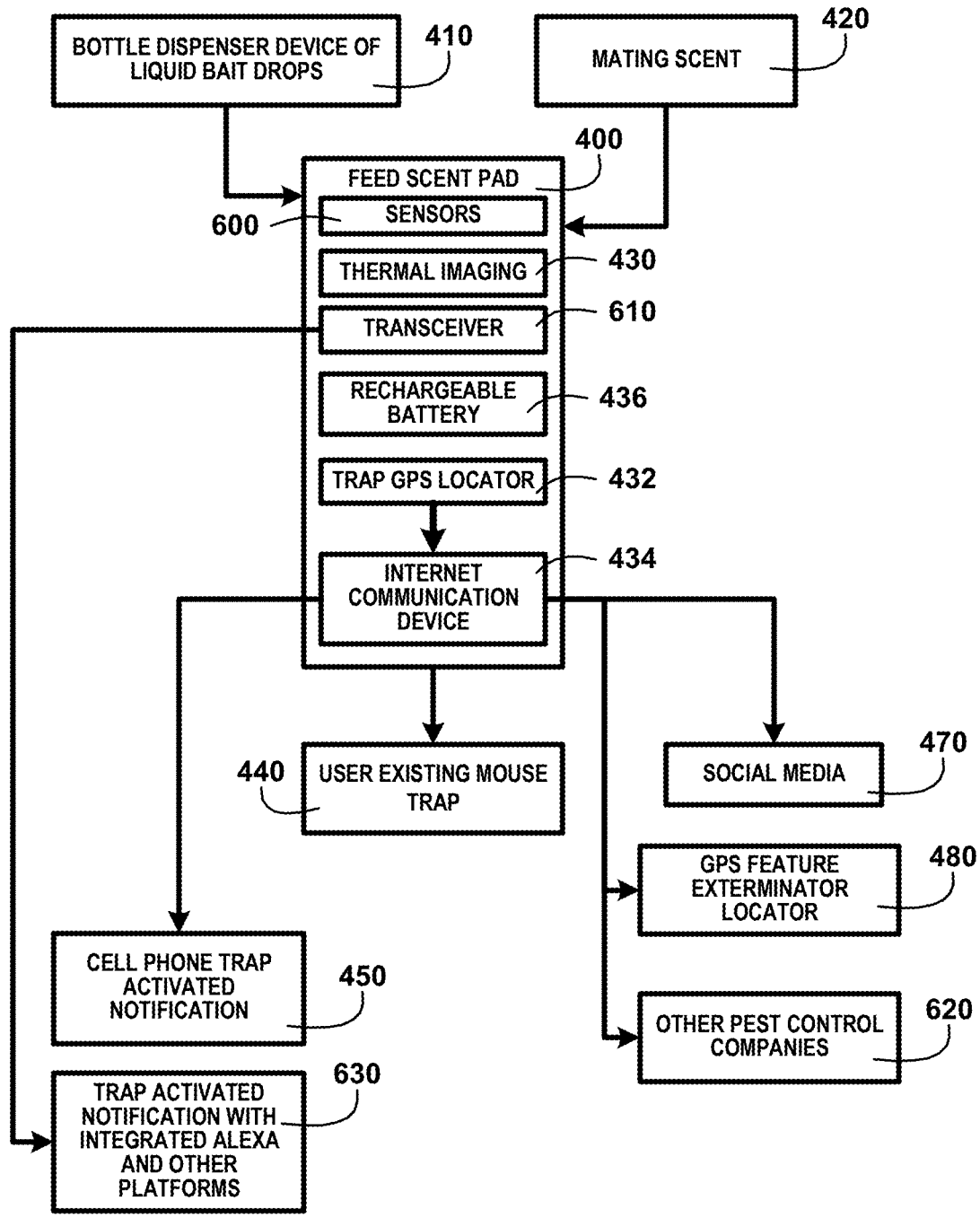
FIG. 6 shows a block diagram of an overview of a feed scent pad addition of one embodiment.

FIG. 6 shows a block diagram of an overview of a feed scent pad addition of one embodiment. FIG. 6 shows the feed scent pad 400 receiving from the bottle dispenser device of liquid peanut butter oil drops 410. The mating scent 420 may be added to the liquid peanut butter oil to renew the mating scent. At least one sensor 600 is coupled to the feed scent pad 400 for detecting the presence of mice at and near the feed scent pad 400 and attracting mice to the feed scent pad 400. A thermal imaging 430 camera may be coupled to the feed scent pad 400 to capture the presence of mice in low light.

A trap GPS locator 432 receives the GPS coordinates of the feed scent pad 400 to identify which mouse trap is being reported on by the overall system. The feed scent pad 400 system is powered by at least one rechargeable battery 436 including a transceiver 610 to transmit trap activation messages. The feed scent pad 400 is coupled to a user's existing mouse trap 440 to increase the interest in feeding by the mice. An internet communication device 434 allows contact with the user when a trap is activated by the capture of a mouse. The internet communication device 434 also provides the user with exterminator 480 contact information and contact information of pest control companies 620.

The user may also access social media 470 to convey information on the successes of the feed scent pad 400 mouse trapping activities. The internet communication device 434 is also available to transmit cell phone trap-activated notifications 450. The transceiver 610 is used to transmit a trap-activated notification with integrated Alexa and other platforms 630 providing the GPS location to the trap location with the trapped mouse. The Alexa device can relay this information when the user is available of one embodiment.

Figure 7:
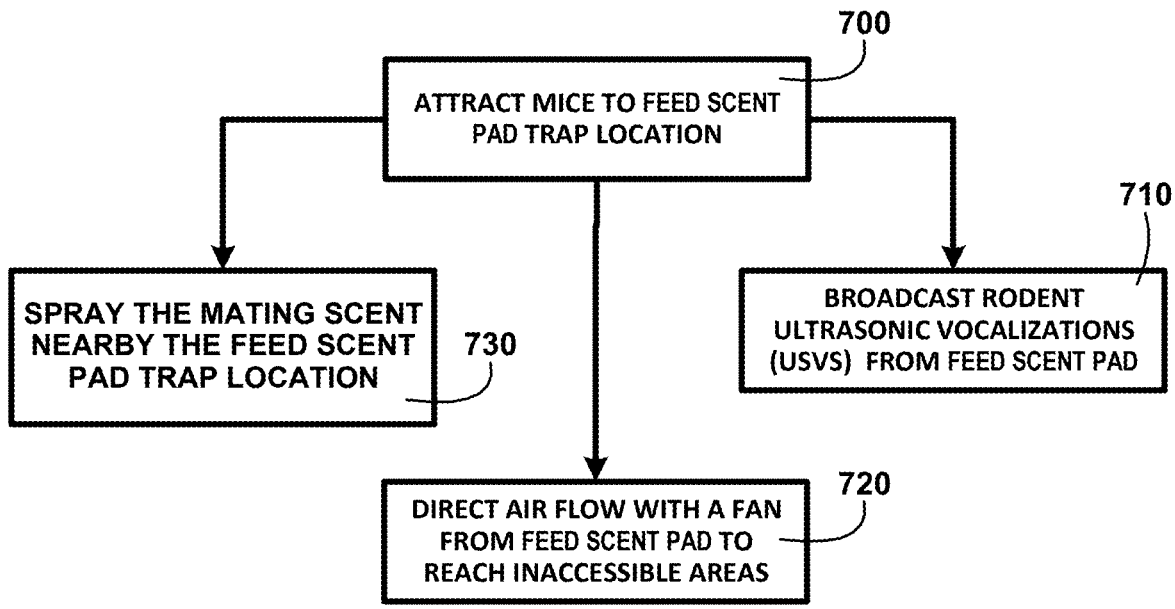
FIG. 7 shows a block diagram of an overview of mouse attraction systems of the feed scent pad of one embodiment.

FIG. 7 shows a block diagram of an overview of mouse attraction systems of the feed scent pad of one embodiment. FIG. 7 shows systems to attract mice to the feed scent pad trap location 700. One system an ultrasonic transmitter will broadcast rodent ultrasonic vocalizations (USVs) from feed scent pad 710 to attract mice by expectations of other mice feeding. A direct air flow with a fan from the feed scent pad to reach inaccessible areas 720. Another system is to spray the mating scent in nearby the feed scent pad trap location 730 to broaden the area of the scent from the feed scent pad of one embodiment.

Figure 8:
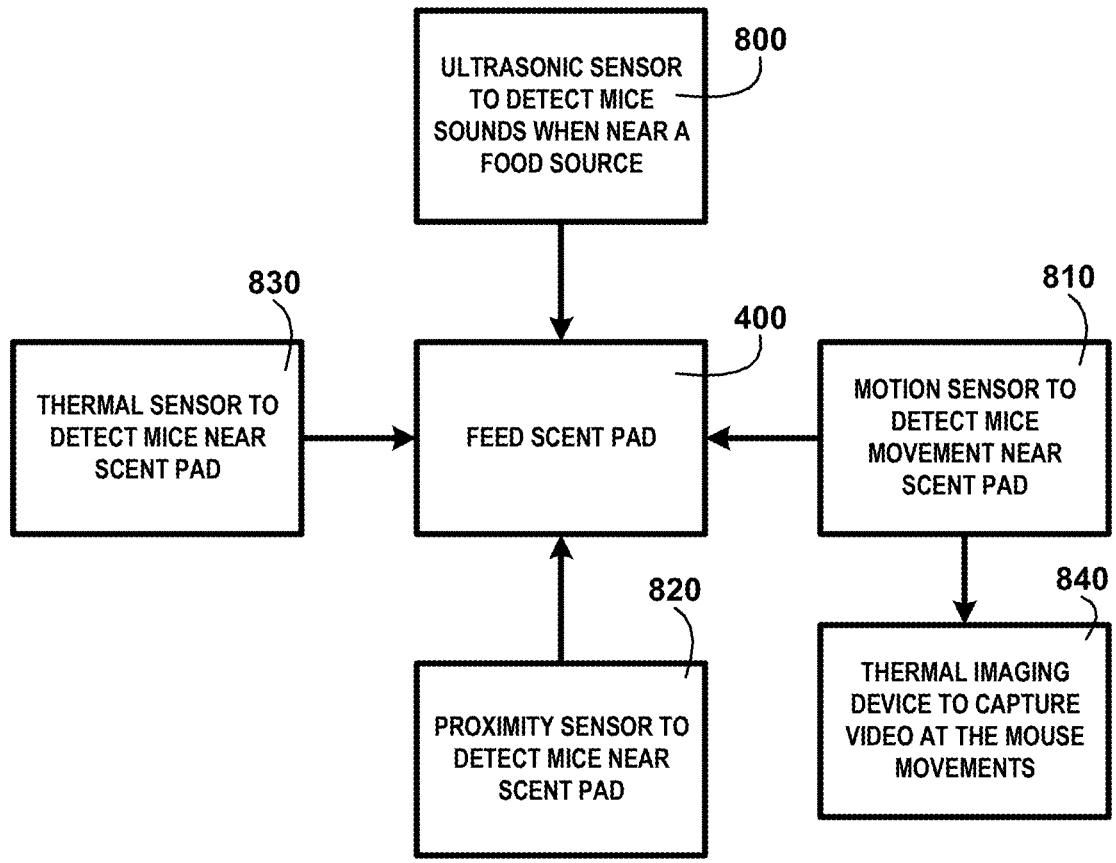
FIG. 8 shows a block diagram of an overview of a feed scent pad mouse detection system of one embodiment.

FIG. 8 shows a block diagram of an overview of a feed scent pad mouse detection system of one embodiment. FIG. 8 shows the feed scent pad 400 having an ultrasonic sensor to detect mice sounds when near a food source 800. A motion sensor to detect mice's movements near the feed scent pad 810 may activate a thermal imaging device. Sensor calibration also plays a role in reducing false triggers. This process involves fine-tuning the sensitivity of various sensors to ensure they are appropriately responsive to rodent activity without being overly sensitive to benign disturbances. For instance, motion detection sensors 1020 can be calibrated to ignore small movements while still detecting larger movements indicative of rodent activity.

Environmental factors such as temperature, humidity, and other conditions significantly impact the performance of rodent control systems. Mice thrive in specific environmental conditions, typically preferring moderate temperatures and higher humidity levels, which influence their activity patterns, feeding behaviors, and nesting preferences. By incorporating sensors 114 that monitor these factors, a smart mouse trap 100 can provide valuable insights into the optimal conditions for attracting and capturing rodents. For instance, if a trap's sensors detect that the surrounding temperature is too low or the humidity is inadequate, the system can alert the user to make adjustments, such as relocating the trap or changing the bait, to enhance its effectiveness.

Combining technologies like thermal camera 1032 imaging, sound sensor 1026 detection, and environmental monitoring creates a comprehensive rodent control solution that addresses various challenges associated with pest management. For example, a smart mouse trap 100 that integrates thermal camera 1032 can identify rodent activity in real-time, while humidity and temperature sensor 1022 can ensure that the bait remains attractive to mice. This synergy of technologies allows for a more nuanced understanding of rodent behavior and enables the user to implement more effective strategies. By continuously monitoring environmental conditions alongside rodent activity, the system can dynamically adapt to changing circumstances, maximizing the chances of successful capture.

However, there are potential challenges that must be addressed when combining these technologies. One such challenge is ensuring that the sensors are accurately calibrated to distinguish between relevant rodent activity and background noise or disturbances. Additionally, environmental factors can vary significantly in different locations, so the system must be capable of adjusting its parameters accordingly. For example, in areas with high humidity, bait may spoil faster, requiring frequent replacements. By addressing these challenges through refined algorithms and user-friendly interfaces, a smart mouse trap 100 can provide a highly effective and informative solution for rodent control.

Considering the impact of environmental factors and integrating various technologies, a smart mouse trap 100 can enhance the effectiveness of rodent control strategies. They offer a proactive approach that not only captures mice but also provides users with valuable data to inform future pest management decisions. Ultimately, this combination leads to more sustainable and efficient solutions, improving the overall management of rodent populations in residential and commercial settings.

Solutions to lessen glue adhesion on mouse traps for ensuring the humane treatment of captured rodents, particularly for glue traps that can inadvertently cause suffering to the animals. This might include specific steps on how to gently detach the mouse from the adhesive surface, as well as recommendations on the best environments for release, such as ensuring that the mouse is freed in a safe area away from human habitation. Reducing the adhesion of glue traps to mice is crucial for promoting humane trapping methods. Here are some potential solutions. Some solutions that reduce the adhesion of holding a mouse in a glue trap include vegetable oil, mineral oil, baby oil, and coconut oil of one embodiment. The solution may take an hour to reduce the adhesion to allow the mouse to be gently removed from the glue trap. The mouse would be released out of doors 300 away from the house or commercial building.

The thermal imaging device will capture video of the mouse movements to create a data file of mouse behavior, specifically if they do not get trapped and may lead to the entrance point on their exit. A proximity sensor to detect mice near scent pad 820 can transmit to a memory device a time and date to track how often a mouse is attracted to the feed scent pad 400. A thermal sensor to detect mice near the feed scent pad 830 to determine the frequency to the feed scent pad at that location, and compare the data with other locations for possible relocation of the trap. All the sensors have wireless transmission capabilities to send data to a feed scent pad 400 central memory device of one embodiment. In another embodiment the sensors may be placed separately at suspected locations of mouse entrances to determine if those are trafficked by the mice.

Figure 9:
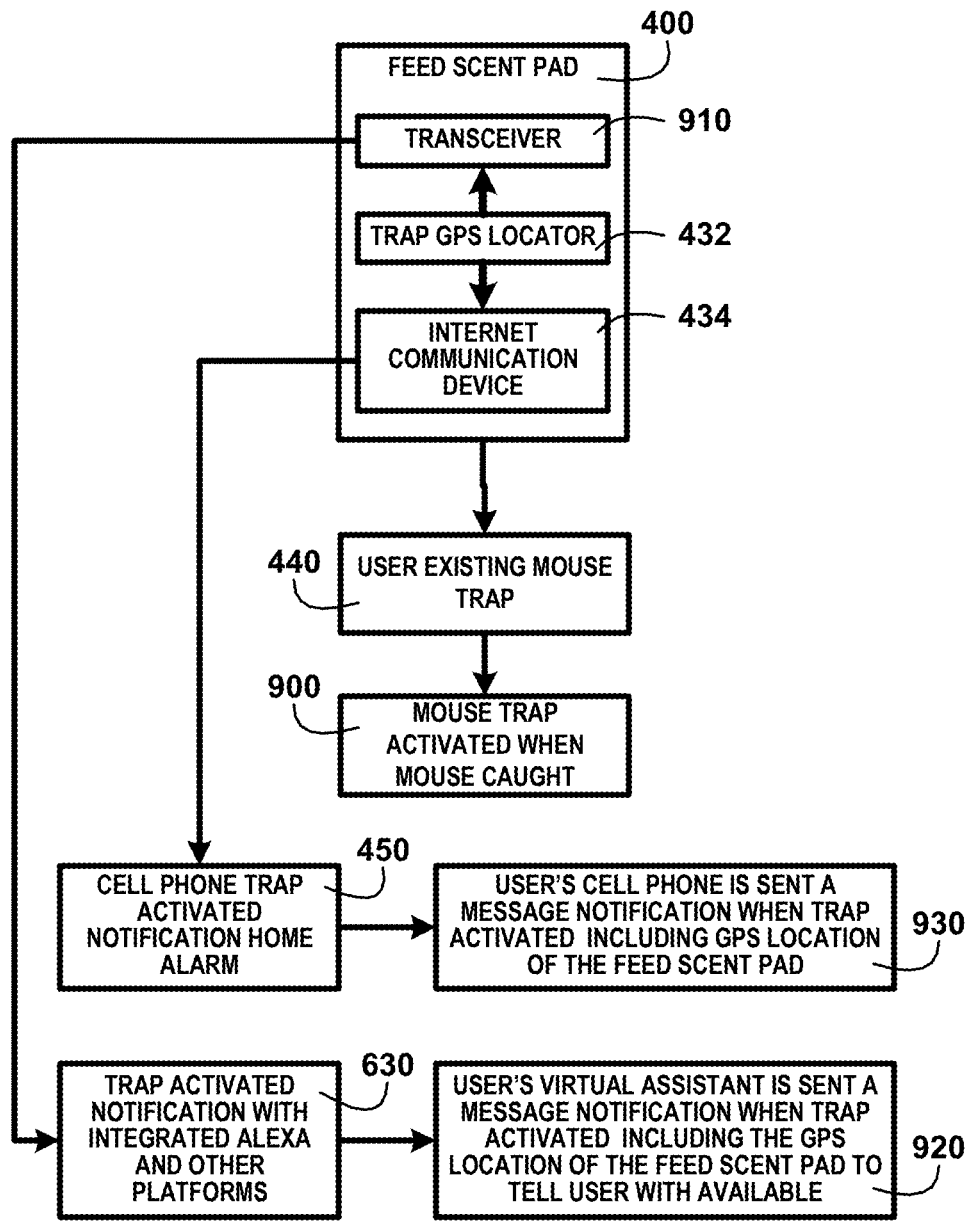
FIG. 9 shows a block diagram of an overview of a feed scent pad trapped mouse notification of one embodiment.

FIG. 9 shows a block diagram of an overview of a feed scent pad trapped mouse notification of one embodiment. FIG. 9 shows the feed scent pad 400 having the transceiver 310, trap GPS locator 432, and internet communication device 434. The user's existing mouse trap 440 traps a mouse after the attraction with the feed scent pad 400. A mouse trap is activated when a mouse is caught 900 status activates the internet communication device 434 and trap GPS locator 432.

Also activated is the cell phone trap-activated notification home alarm 450. The user's cell phone is sent a message notification when the trap is activated including the GPS location of the feed scent pad. The mouse trap activated when the mouse caught 900 status activates the transceiver 910 to signal a trap-activated notification with integrated Alexa and other platforms 630 with the GPS location from the trap GPS locator 432. The user's virtual assistant is sent a message notification when the trap is activated including the GPS location of the feed scent pad to tell the user with available 620 of one embodiment.

Figure 10:
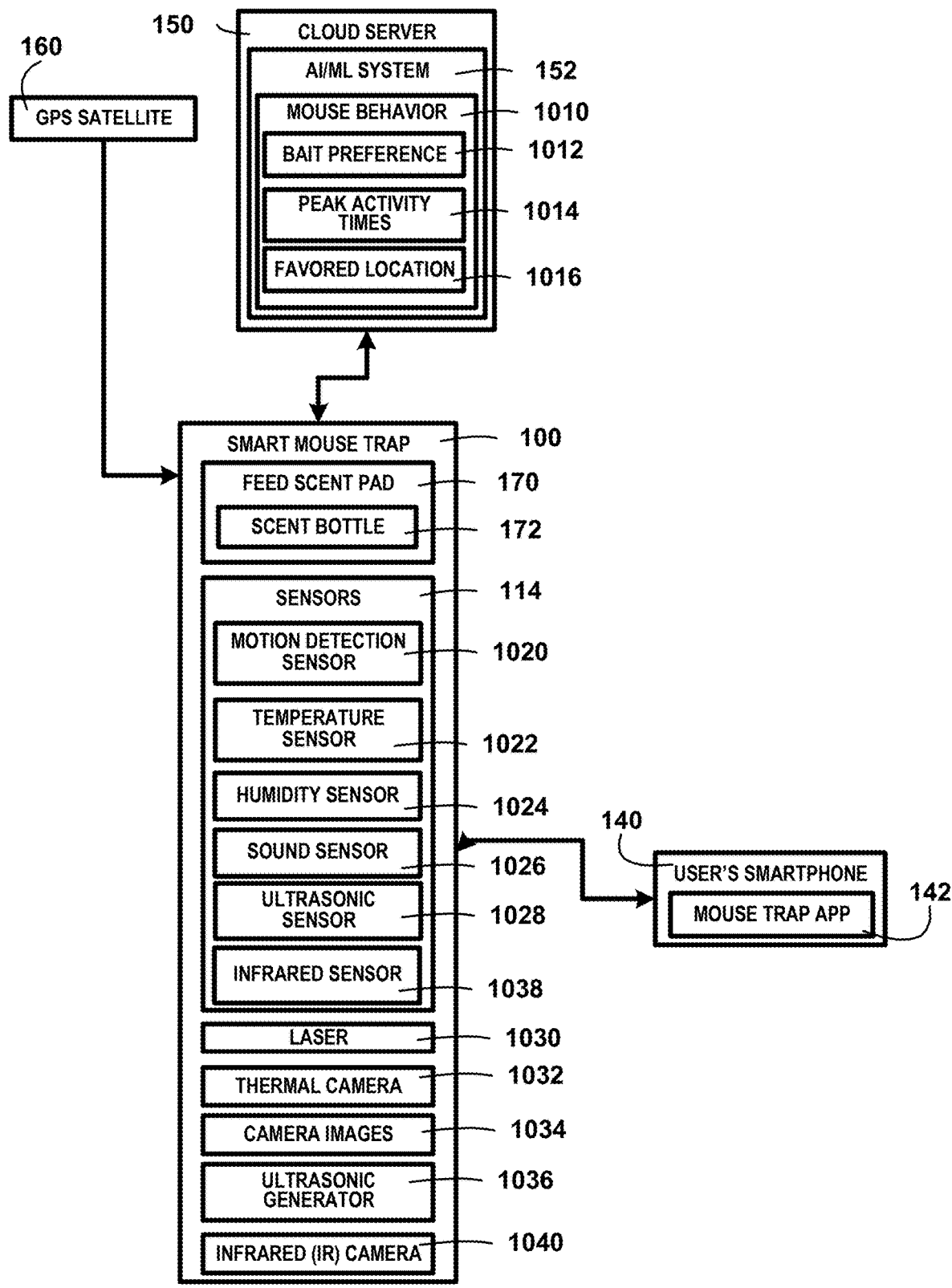
FIG. 10 shows a block diagram of an overview of a smart mouse trap of one embodiment.

FIG. 10 shows a block diagram of an overview of a smart mouse trap of one embodiment. FIG. 10 shows the smart mouse trap 100 including the feed scent pad 170 and scent bottle 172. The sensors 114 include at least one motion detection sensor 1020, temperature sensor 1022, humidity sensor 1024, sound sensor 1026, ultrasonic sensor 1028 and other sensors. The smart mouse trap 100 includes a laser 1030 to track mouse movements over a laser grid projected on a floor.

A variety of motion detection technologies can be applied for this purpose, such as infrared sensor 1038, ultrasonic sensor 1028, and passive infrared (PIR) sensors. PIR sensors, for example, detect the infrared energy emitted by warm-blooded animals, such as mice, as they move through a space. These sensors are placed in key areas where mice are likely to travel, such as along walls, near food storage areas, or close to potential entry points. Each sensor can cover a certain area, and the data they collect can help identify high-traffic zones, allowing homeowners or pest control specialists to target problem areas more effectively.

In one embodiment the apparatus includes a mobile application operating on a mobile device and coupled to a remote server and an image capture device and configured to capture images of an area surrounding the mouse trap and to transmit the captured images to the remote server, wherein the image capture device is further configured to scan at least one of the plurality of QR code identifiers to determine a location of an area of the mouse trap.

A plurality of sensors coupled to the mobile application and located at different locations and configured to detect environmental conditions at the different locations and assigned to at least one of the plurality of QR code identifiers.

And wherein the remote server is coupled to a database and a processor and configured to receive the captured images for analyzing and comparing the captured images to known mice patterns to create results identifying matching patterns that indicate habits and the interactions of the mice near the area at the location of the mouse trap.

A graphical user interface coupled to the mobile application and configured to display an alert to a user when a mouse is present near the area, to display actual interactions to the user with at least one eradication recommendation based on the known mice patterns at the location and the detected environmental conditions for allowing the user to mitigate infestation of the mice at the location and to prevent additional mice infestation within the location.

And wherein the graphical user interface is further configured to display a map of the location of the at least one of the plurality of QR code identifiers associated with the identified location within the area.

One of the main benefits of using motion detection sensors 1020 for this purpose is that they can operate continuously, providing data over time without any direct observation needed. By tracking movement patterns over several days or weeks, one can gain insights into a mouse's behavior, such as its active hours, nesting sites, and preferred pathways. This information is especially useful for developing targeted control measures. For instance, identifying patterns in mouse 130 activity can guide where to place traps or seal entry points, reducing the likelihood of reinfestation. In addition, many modern motion detection systems can connect to mobile apps, enabling homeowners to receive alerts whenever activity is detected, facilitating prompt action and more effective pest management.

Using motion detection sensors 1020 to track the movement of mice in a house is an effective way to monitor rodent activity, providing critical information for pest control, behavior analysis, and even structural integrity checks. Motion detection sensors 1020 work by detecting changes in the environment, such as temperature variations or movement, allowing for real-time tracking of a mouse 130 location. This approach is less invasive than traditional trapping methods and enables continuous monitoring, so it's often used for observing mouse behavior 1010, entry points, and movement patterns within a home.

A variety of motion detection technologies can be applied for this purpose, such as infrared sensor 1038, ultrasonic sensor 1028, and passive infrared (PIR) sensors. PIR sensors, for example, detect the infrared energy emitted by warm-blooded animals, such as mice, as they move through a space. These sensors are placed in key areas where mice are likely to travel, such as along walls, near food storage areas, or close to potential entry points. Each sensor can cover a certain area, and the data they collect can help identify high-traffic zones, allowing homeowners or pest control specialists to target problem areas more effectively.

One of the main benefits of using motion detection sensors 1020 for this purpose is that they can operate continuously, providing data over time without any direct observation needed. By tracking movement patterns over several days or weeks, one can gain insights into a mouse's behavior, such as its active hours, nesting sites, and preferred pathways. This information is especially useful for developing targeted control measures. For instance, identifying patterns in mouse 130 activity can guide where to place traps or seal entry points, reducing the likelihood of reinfestation. In addition, many modern motion detection systems can connect to mobile apps, enabling homeowners to receive alerts whenever activity is detected, facilitating prompt action and more effective pest management.

Using a low-power laser 1030 to track the movements of mice via a grid on a floor is an innovative method that combines precision tracking with non-invasive observation. By creating a virtual grid on the floor of the observation area, researchers can monitor the exact position and movements of the mice without physically interfering. Low-power laser 1030 emit light that can map the grid invisibly, with only minimal adjustments to the environment needed to ensure the laser 1030 accuracy and to maintain the welfare of the animals. The setup usually involves projecting a grid of laser 1030 light across the observation floor. As mice move through this grid, they disrupt the laser 1030 beams, which are then detected by motion detection sensors placed around the perimeter or beneath the floor.

Each intersection of the laser 1030 grid can act as a coordinate point, allowing for highly accurate tracking of the animal's location. These coordinates are processed in real-time, with tracking software interpreting the pattern of movements to analyze behavioral patterns, speed, and spatial preferences.

Low-power laser 1030 are especially suitable for this purpose because they are safe for small animals like mice, minimizing any health risk or behavioral disturbance. Compared to traditional tracking systems that may rely on overhead cameras or invasive tags, a laser 1030 grid system can operate in lower lighting and even in complete darkness, making it ideal for tracking nocturnal or light-sensitive species. This technique is useful for a variety of research fields, from behavioral neuroscience to pharmacology, as it provides fine-grained data on mouse behavior 1010 without physical intrusion.

Temperature sensor 1022 and humidity sensor 1024 play a crucial role in monitoring environmental conditions to optimize bait effectiveness and attract mice and other rodents. Understanding the specific preferences of mice for temperature and moisture levels can significantly enhance baiting strategies. Mice typically thrive in environments that offer certain temperature ranges (usually around 70° F. to 80° F.) and higher humidity levels, which can influence their activity patterns and feeding behavior. By integrating temperature sensor 1022 and humidity sensor 1024 into a pest management system, users can gain insights into the ideal conditions that might attract rodents, enabling them to create a more inviting environment for effective trapping.

Advanced trap monitoring systems equipped with sensors and cameras can distinguish between normal and unusual activity, such as a mouse 130 darting across the floor without approaching the bait or even a sudden environmental change like a garage door opening. If a mouse exhibits unusual behavior—like moving at a high speed across the floor without investigating the trap—the system can flag it as a potential evasion or an indication that the mouse 130 is wary of the setup. This information, when combined with smartphone alerts, allows users to take a closer look at why the bait might not be effective or if the mouse 130 has identified a possible entry or escape route, prompting faster adjustments to optimize trapping efforts.

In cases where environmental factors like a garage door opening or vibrations are detected, the smartphone notification can alert users to check for unexpected influences that might disrupt the trapping process. For example, an open garage door could signify a new potential entry or escape point for mice. The user is immediately informed and can then respond by securing the area to prevent additional entry or using deterrent measures. This intelligent alert system not only makes pest control more effective but also helps identify larger structural vulnerabilities. By integrating smartphone notifications, users gain a real-time, comprehensive view of mouse 130 activity and their surrounding environment, allowing them to stay one step ahead in preventing and managing rodent issues.

A high-resolution infrared camera 1040 can be a powerful tool for detecting mice, as it leverages the thermal radiation—or heat signatures—that mice emit. Unlike visible light cameras, infrared (IR) camera 1040 can capture temperature variations, allowing them to "see" through thin barriers, such as drywall or wood paneling, to locate warm-blooded animals like mice. The camera's high sensitivity to heat makes it possible to track even subtle temperature differences, which appear as distinct visual patterns or thermal images the mobile app displays on screen. These images make it easy to identify the presence, location, and movement of a mouse 130, even if it's hiding in a wall, behind a barrier, or tucked into a dark corner.

A high-resolution infrared camera 1040 offer several advantages for monitoring mouse 130 activity in hidden spaces. The detailed imaging allows users to see not just that a mouse 130 is present, but also to distinguish its movements and behavior patterns in real-time. This precision is especially valuable in homes or commercial spaces where understanding exact nesting areas and pathways can inform more targeted control efforts. With the high resolution of the camera, even small rodents can be distinctly identified, providing clarity that's often difficult to achieve with standard, lower-resolution IR technology.

The technology behind infrared camera 1040 involves detecting the infrared wavelengths of heat naturally emitted by animals. When mice move, the thermal contrast against the cooler background makes their heat signature even more apparent, allowing the camera to "see" through obstructions that would otherwise block standard video monitoring. This capability enables pest control professionals to identify nesting areas or frequently used paths, allowing for precise intervention points. Using high-resolution infrared camera 1040 not only streamlines detection but also offers a non-invasive way to track mice over time, providing insights that can guide preventative measures for long-term control.

A thermal camera 1032 detects mice in low light through the body heat of the mice. Camera images 1034 are recorded in the cloud server 150 for analysis on the ML system. An ultrasonic generator 1036 broadcasts ultrasonic sounds similar to those used by mice to move food to increase their sense of smell. A user's smartphone 140 has installed a smart mobile app 142 to receive notifications that a mouse has been trapped. The smart mouse trap 100 is positioned near a user existing mouse trap 1040. The smart mouse trap 100 increases the attraction to the user existing mouse trap 1040 to draw the mouse 130 closer to the bait on the user existing mouse trap 1040. The smart mouse trap 100 sensor data and camera images 1034 are recorded on the cloud server 150 for processing with the AI/ML system 152. The AI/ML system 152 learns from the data and images a mouse behavior 1010. The mouse behavior 1010 determinations are sent to the user with recommendations for bait preference 1012, peak activity times 1014, and favored location 1016. The user transmits to the AI/ML system 152 changes made in the bait selection and trap locations using the GPS satellite 160 coordinates to identify the location.

Bait monitoring to determine a mouse's interest in and preference for specific baits is a valuable approach for effective pest management and behavioral research. By closely observing and tracking how mice approach, inspect, and interact with different bait options, researchers or pest control specialists can assess which types are more attractive or effective. This insight can lead to better strategies for trapping, luring, or repelling mice, minimizing trial and error while maximizing efficacy.

A bait monitoring system typically includes sensors or cameras positioned around the bait station to detect the presence and behavior of mice as they approach and interact with the bait. By using infrared or motion-detection technology, these systems can record each instance when a mouse 130 comes close to or touches the bait, along with the time spent in interaction. For example, if mice spend more time investigating a certain type of bait, it can be inferred that they find it more attractive, whereas bait that is consistently avoided can be flagged as ineffective. Detailed observations like these help determine the relative attractiveness of different bait options, allowing for an evidence-based approach to pest control.

Additionally, by experimenting with various bait types—such as sweet, protein-rich, or fatty baits—researchers can refine their understanding of dietary preferences among mice, which can vary by species and individual preference. Over time, monitoring data can reveal specific preferences for baits that cater to the mice's natural inclinations, such as high-energy foods. This knowledge can lead to more targeted baiting strategies and even aid in developing customized, eco-friendly pest control solutions. When combined with a digital tracking system, bait monitoring can provide real-time alerts when a mouse 130 interacts with a bait, enabling timely interventions and more efficient control measures.

Notification preferences represent another important aspect of customizable settings. Users can specify how and when they wish to receive alerts, whether via push notifications, email, or SMS. This feature is particularly valuable for individuals who may not be continuously monitoring their pest control systems. Users can set thresholds for alerts based on trap activations, environmental changes, or even sound sensor 1026 detections related to rodent activity. By tailoring these notifications, users can prioritize information that is most relevant to them, ensuring they remain informed without feeling overwhelmed by excessive alerts. This comprehensive customization not only enhances user satisfaction but also contributes to a more proactive and effective approach to rodent management.

Minimizing false positives is a crucial aspect of developing effective rodent control systems, as unnecessary triggers can lead to user frustration, wasted resources, and decreased trust in the monitoring technology. To address this challenge, manufacturers can implement refined algorithms and sophisticated sensor calibration techniques. These enhancements allow the system to more accurately differentiate between rodent activity and other disturbances in the environment, such as movement from non-target animals, wind, or vibrations.

Overall, the integration of refined algorithms and meticulous sensors 114 calibration is essential for enhancing the reliability of rodent control systems. By minimizing false triggers, these advancements contribute to a more efficient and user-friendly experience, allowing individuals and pest control professionals to focus their efforts on genuine rodent activity rather than being distracted by unnecessary alerts. Ultimately, this leads to more effective pest management strategies and a higher level of confidence in the monitoring technology employed.

A miniature thermal camera 1032 is a powerful tool for detecting mouse 130 activity, capable of sensing the body heat of mice even when they are partially hidden in walls, behind obstacles, or within enclosed spaces. Unlike conventional cameras, which rely on visible light, a thermal camera 1032 captures infrared radiation, emitted as heat, allowing them to pick up the warmth of a mouse 130 body through thin walls, around corners, or inside boxes. This ability to detect mice in otherwise concealed areas makes a thermal camera 1032 highly effective for tracking rodents in environments where they might typically evade detection.

One of the primary advantages of using a miniature thermal camera 1032 for mouse 130 detection is its versatility in various settings. In residential or commercial buildings, mice often dwell in hard-to-reach areas, like wall cavities, attics, and cluttered spaces. The thermal camera 1032 can be directed toward such areas to identify any warm spots indicative of a mouse 130 presence. This non-intrusive approach not only saves time by pinpointing exact locations of activity but also reduces the need for invasive inspections that can disrupt structures. For pest control specialists, this means that interventions can be more precisely targeted, reducing the reliance on indiscriminate placement of traps or bait preference 1012.

Moreover, a miniature thermal camera 1032 is compact and can be integrated into other monitoring systems for continuous surveillance. This allows for real-time tracking of mouse 130 movements, providing insights into when and where mice are most active. Because a thermal camera 1032 work effectively in low-light or dark conditions, they can monitor nocturnal mouse 130 activity without additional lighting, which could otherwise disturb natural behavior. For researchers, using thermal camera 1032 imaging offers an ethical and minimally invasive method for studying mouse behavior 1010, helping to analyze nesting habits, social interactions, and movement patterns in environments that simulate their natural habitats. Overall, a miniature thermal camera 1032 are invaluable for accurately detecting and managing rodent populations in a variety of challenging environments.

A smartphone mobile app that displays a thermal camera 1032 image overlay on a floor plan can revolutionize the way we visualize and track mouse 130 activity in homes or commercial spaces. By combining thermal camera 1032 imaging with spatial mapping, the mobile app provides users with a comprehensive view of where mice are located relative to specific rooms, walls, or objects. The mobile app could use real-time data from high-resolution infrared camera 1040, generating an overlay that displays the heat signature of any mouse 130 as a distinct, moving dot or shape on the floor plan. This visual representation allows users to pinpoint exactly where mice are located within a few feet, even if they're moving behind walls or under furniture.

The floor plan overlay with thermal camera 1032 imaging gives users an intuitive understanding of the mouse 130 location and movement patterns. For instance, as the thermal camera 1032 image updates in real-time, users can see if the mouse 130 is consistently following certain routes, dwelling near particular areas (like a pantry or basement), or approaching and interacting with bait stations. Such detailed tracking can reveal patterns of behavior, such as favored nesting spots or entry points, that would be difficult to observe otherwise. This data-driven approach enables users to make more precise adjustments to bait preference 1012 placement, trap positioning, or structural modifications to prevent further entry.

Beyond providing real-time mouse 130 location, the mobile app could also store past movement data, creating a visual history of activity on the floor plan. Users could review this data to identify high-traffic areas or entry points, revealing trends over time. Such insights could also allow pest control professionals to offer targeted solutions tailored to the exact needs of the property. Ultimately, a smartphone mobile app with thermal camera 1032 image overlays on a floor plan provides a clear, actionable view of rodent activity, making it easier to implement efficient and effective control measures.

In one embodiment a plurality of sensors coupled to a user's existing mouse trap, located at various points in a building area, configured to detect mouse behavior, including motion, temperature, ultrasound, infrared imaging, GPS coordinates, and time. A proximity sensor coupled to the user's existing mouse trap configured to detect nearby mice and record time and date for tracking mouse visits frequency. A thermal imaging device coupled to the user's existing mouse trap configured to capture thermal images of nearby rodents. A GPS locator coupled to the user's existing mouse trap configured to identify the mouse trap's location. A cloud server coupled to a database and processor, configured to receive and analyze captured images to identify behavioral patterns for predicting mouse presence. A mobile app coupled to the cloud server, configured to enabling users to view live feeds, stored clips, and transmit images. An ai device using machine learning configured to analyze sensor data and compare behavioral patterns. A mobile app coupled to a camera coupled to the user's existing mouse trap, configured to transmit images, mouse paths, trap recommendations, and favored bait to the cloud. At least one rechargeable battery coupled to the user's existing mouse trap configured to power the sensors and electronic devices.

Artificial Intelligence (AI) can be integrated with sensor data, camera images, and intelligent bait preference 1012 selection of the present invention. In one embodiment, AI user interaction with machine learning algorithms that analyze data collected from various sensors, including motion detectors, thermal camera 1032, and sound sensors. By continuously learning from this data, the system can identify patterns in rodent behavior, such as peak activity times and preferred pathways, allowing for more targeted and effective control measures. For instance, if the AI detects a high frequency of activity near a particular bait station, it can suggest optimizing bait placement or changing bait preference 1012 types to improve capture rates.

Another key aspect of AI interaction in the present invention for rodent control is the use of computer vision techniques to analyze camera images. Advanced image recognition algorithms can differentiate between rodents and non-target animals, ensuring that only relevant activity is considered in the data analysis. By integrating this visual data with historical activity logs, the AI can create a comprehensive profile of rodent behavior, helping users to understand which areas are most vulnerable to infestations. Additionally, this AI system can enable real-time monitoring, allowing users to receive instant alerts when rodent activity is detected, thereby facilitating prompt intervention.

Incorporating AI into bait preference 1012 selection enhances the effectiveness of trapping strategies by leveraging data-driven insights. An artificial intelligence device with machine learning configured to analyze captured images and sensor data to compare and identify patterns of mouse behavior. Machine learning models can analyze previous bait preference 1012 interactions, user preferences, and environmental conditions to recommend the most effective bait preference 1012 types for specific situations. For example, if data shows that mice in a particular area prefer one bait preference 1012 over another, the system can automatically suggest using that bait preference 1012 for future traps. This personalization not only increases the likelihood of successful captures but also reduces waste associated with ineffective bait preference 1012 options.

Moreover, user interfaces designed for AI interaction can be made intuitive and user-friendly, allowing non-expert users to easily understand and leverage the technology. Dashboards that visualize sensor data, camera feeds, and bait preference 1012 performance in an easily digestible format empower users to make informed decisions quickly. By combining advanced AI capabilities with clear user interactions, rodent control systems can achieve higher efficiency in managing mouse 130 populations, ultimately leading to more effective pest management solutions. This integration of technology not only improves the user experience but also fosters a proactive approach to rodent control that is adaptable to changing conditions and evolving challenges.

Sound sensor 1026 detection technology can be an invaluable tool in identifying potential rodent infestations by monitoring for unusual noises such as scratching or squeaking. Rodents are naturally vocal creatures and often communicate through a variety of sounds, especially when they feel threatened or are interacting with their environment. By employing sensitive microphones or acoustic sensors, a monitoring system can pick up these sounds, alerting homeowners or pest control professionals to the presence of rodents before the infestation becomes significant. This early detection method is particularly useful in areas where visual inspection may be challenging, such as inside walls, attics, or enclosed spaces like cardboard boxes.

These sound sensor 1026 detection systems can be programmed to differentiate between normal background noises and specific frequencies associated with rodent activity. For example, the scratching sound made by mice as they attempt to nest or move through materials can be distinctive, often falling within a specific frequency range that can be detected and analyzed. When the system identifies these sounds, it can trigger a notification to the user's smartphone or central monitoring dashboard, prompting them to investigate further. This proactive approach allows for early intervention, potentially preventing the establishment of a larger rodent population.

Integrating sound sensor 1026 detection with other monitoring technologies—such as motion detection sensors 1020, thermal camera 1032, or bait monitoring systems—can enhance overall effectiveness. For instance, if sound sensor 1026 detection indicates unusual activity in a particular area, other monitoring systems can be directed to that location for further analysis. This multi-faceted approach provides a comprehensive view of the situation, enabling more informed pest control strategies. Moreover, the ability to monitor for sounds over time can reveal patterns of rodent behavior, such as peak activity times or favored locations, allowing users to adjust their prevention and control measures accordingly. Overall, sound sensor 1026 detection represents an innovative and effective method for early rodent identification, helping to manage infestations efficiently before they escalate.

Data logging plays a crucial role in the field of rodent management by enabling the storage and analysis of historical data related to mouse 130 and rodent activity. By systematically collecting data on factors such as population density, behavior patterns, and environmental conditions over time, researchers and pest control professionals can identify trends that inform more effective management strategies. This data-driven approach allows for a deeper understanding of mouse behavior 1010, nesting habits, and seasonal activity variations, which can significantly improve pest control measures.

Historical data logging can encompass a variety of metrics, including the frequency of rodent captures, bait preference 1012 interactions, temperature and humidity levels, and even sound sensor 1026 detection logs. For instance, by analyzing data from various seasons, pest control specialists can determine when mice are most active, such as during colder months when they seek warmth and shelter, or during specific times of the year when food sources are scarce. Identifying these trends allows for proactive interventions, enabling users to deploy traps or bait preference 1012 more strategically during peak activity periods, thus improving overall capture rates.

Additionally, data logging can reveal correlations between environmental factors and rodent behavior. For example, monitoring temperature and humidity alongside mouse 130 activity levels can provide insights into the conditions that make areas more attractive to rodents. By understanding these relationships, pest control efforts can be adjusted to mitigate ideal conditions for rodent habitation, such as sealing entry points or making changes to food storage practices.

Furthermore, historical data can also aid in evaluating the effectiveness of various control methods over time, guiding future pest management decisions and allowing for the development of more tailored, evidence-based strategies. Ultimately, leveraging data logging for historical trend identification in rodent management enhances the effectiveness and sustainability of pest control efforts. By utilizing comprehensive data analytics, stakeholders can make informed decisions that not only address current infestations but also prevent future ones, leading to a more proactive and efficient approach to rodent control. Customizable settings in rodent control systems significantly enhance user experience and effectiveness by allowing individuals to tailor various parameters according to their specific needs and preferences. One key feature is the ability to adjust trap sensitivity, which enables users to calibrate how responsive the traps are to rodent activity. For instance, in areas with high levels of non-target animal activity, users can lower the sensitivity to prevent false activations while ensuring that traps remain effective for capturing mice. This level of customization helps optimize the performance of the traps and reduces unnecessary alerts, making monitoring more manageable and efficient.

In addition to sensitivity adjustments, users can also customize bait preference 1012 types to align with rodent preferences. Different species of rodents are attracted to various bait preference 1012 flavors and compositions, so allowing users to select specific bait preference 1012 types increases the likelihood of successful captures. For example, a system might allow users to choose between one bait or another formulations based on previous activity patterns recorded in the area. This flexibility ensures that users can implement more effective trapping strategies, leading to improved outcomes in rodent control.

The foregoing has described the principles, embodiments, and modes of operation of the present invention. However, the invention should not be construed as being limited to the particular embodiments discussed. The above-described embodiments should be regarded as illustrative rather than restrictive, and it should be appreciated that variations may be made in those embodiments by workers skilled in the art without departing from the scope of the present invention as defined by the following claims.

What is claimed is:

1. A system for controlling infestation of rodents with a smart mouse trap, comprising:
    a plurality of lures for the rodents including a feed scent pad coupled to a refillable scent bottle and configured to receive liquid scents from the refillable scent bottle for continuous replenishment of the scent pad and an ultrasonic transmitter configured to broadcast food-associated rodent ultrasonic vocalizations to attract the rodents;
    a motion detector coupled to a camera and coupled to a remote server configured to activate the camera to capture images when the motion detector detects the presence of the rodents in close proximity to the smart mouse trap, wherein the camera transmits the captured images to a remote server and wherein the motion detector is further configured to transmit data, including the date and time of detection, to the remote server;
    a thermal imaging device attached to the smart mouse trap configured to capture thermal images of the rodents in close proximity to the smart mouse trap and to transmit the captured thermal images to the remote server;
    a mobile application operating on a mobile device having an image capture device and coupled to the remote server, wherein the image capture device is configured to scan at least one QR code identifier to determine a location of an area of the smart mouse trap, wherein a GPS chip integrated into the mobile device receives and records the GPS coordinates of the QR code identified location;
    a plurality of sensors coupled to the mobile application and located at different locations and configured to detect environmental conditions and record behaviors of the rodents at the different locations and assigned to at least one QR code identifier, wherein the remote server uses the recorded behaviors and the captured images to calculate discovered behavioral patterns of the rodents;

a pattern recognition processor coupled to the remote server configured to receive the captured images and the sensor data from the smart mouse trap in relation to the plurality of lures to analyze and compare the discovered behavioral patterns of the rodents to known rodent behavior patterns for generating results that identify matching patterns with insights into rodent habits and interactions near the smart mouse trap location, including feeding responses at the feed scent pad, the ultrasonic vocalizations and movement paths around the trap, wherein the pattern recognition processor is further configured to generate insights into rodent habits and interactions with the plurality of lures for recommending at least one of relocation of the smart mouse trap or modification of the plurality of lures to improve rodent capture effectiveness;

a graphical user interface coupled to the mobile application and configured to display an alert to a user when at least one of the rodents are in close proximity to the smart mouse trap and to display eradication recommendations based on the results for allowing a user to mitigate infestation of the rodents and to prevent other rodents within the location, wherein the graphical user interface is further configured to display a map showing the location associated with the at least one QR code identifier; and wherein the plurality of sensors includes a plurality of biohazard detection sensors configured to detect pathogens and volatile gases associated with the rodents.

2. The system for controlling infestation of rodents with a smart mouse trap of claim 1, further comprising a processor coupled to the remote server configured to generate a map of the QR code identified locations of the smart mouse trap, the plurality of sensors, and image capture devices for display on the graphical user interface, and to provide recommended relocation of the smart mouse trap to areas of higher rodent activity based on historical data.

3. The system for controlling infestation of rodents with a smart mouse trap of claim 1, wherein at least one sensor is configured to be placed separately from the smart mouse trap at suspected locations of rodent entrances to determine if those are trafficked by the rodents, the sensor further comprising a gas or VOC sensor to detect rodent urine or droppings.

4. The system for controlling infestation of rodents with a smart mouse trap of claim 1, wherein the mobile application is further configured to generate reports detailing an effectiveness of the location of the smart mouse trap, frequency of interactions between rodents and the rodent traps and to inform the user of predictive modeling on rodent activity patterns, and identify potential entry points of the rodents, the reports further including biohazard alerts associated with detected pathogens.

5. The system for controlling infestation of rodents with a smart mouse trap of claim 1, further comprising motion detection sensors with low light infrared sensors configured to detect movement in the surrounding area in low-light or nighttime conditions.

6. The system for controlling infestation of rodents with a smart mouse trap of claim 1, further comprising at least one ultrasonic sound sensor configured to detect sounds of the rodents and an ultrasonic transmitter configured to broadcast rodent ultrasonic vocalizations (USVs) from a rodent trap to attract rodents, the ultrasonic transmitter being configured to mimic rodent food-transport signals to enhance lure effectiveness.

7. The system for controlling infestation of rodents with a smart mouse trap of claim 1, wherein the thermal imaging device is a thermal imaging camera configured to detect infrared radiating heat from the rodents and convert the infrared radiating heat into a visible image of the rodents to identify the rodents based on their heat signatures near the smart mouse trap to allow the tracking of the movements of the rodents and their behavior in low-light conditions, the thermal imaging camera being further configured to transmit data to the AI/ML processor for pattern recognition and relocation analysis.

8. A system for controlling infestation of rodents with a smart mouse trap, comprising:

a plurality of lures for the rodents including a feed scent pad coupled to a refillable scent bottle and configured to receive liquid scents from the refillable scent bottle for continuous replenishment of the scent pad and an ultrasonic transmitter configured to broadcast food-associated rodent ultrasonic vocalizations to attract the rodents;

a motion detector coupled to a camera and coupled to a remote server configured to activate the camera to capture images when the motion detector detects the presence of the rodents in close proximity to the smart mouse trap, wherein the camera transmits the captured images to a remote server and wherein the motion detector is further configured to transmit data, including the date and time of detection, to the remote server;

a thermal imaging device attached to the smart mouse trap configured to capture thermal images of the rodents in close proximity to the smart mouse trap and to transmit the captured thermal images to the remote server, wherein the thermal imaging device is a thermal imaging camera configured to detect infrared radiating heat from the rodents and convert the infrared radiating heat into a visible image of the rodents to identify the rodents based on their heat signatures near the smart mouse trap to allow the tracking of the movements of the rodents and their behavior in low-light conditions;

a mobile application operating on a mobile device having an image capture device and coupled to the remote server, wherein the image capture device is configured to scan at least one QR code identifier to determine a location of an area of the smart mouse trap, wherein a GPS chip integrated into the mobile device receives and records the GPS coordinates of the QR code identified location;

a plurality of sensors coupled to the mobile application and located at different locations and configured to detect environmental conditions and record behaviors of the rodents at the different locations and assigned to at least one QR code identifier, wherein the remote server uses the recorded behaviors and the captured images to calculate discovered behavioral patterns of the rodents;

a pattern recognition processor coupled to the remote server configured to receive the captured images and the sensor data from the smart mouse trap in relation to the plurality of lures to analyze and compare the discovered behavioral patterns of the rodents captured images to known rodent behavior patterns for generating results that identify matching patterns with insights into rodent habits and interactions near the smart mouse trap location, including feeding responses at the feed scent pad, the ultrasonic vocalizations and movement paths around the trap, wherein the pattern recognition processor is further configured to generate insights into rodent habits and interactions with the plurality of lures for recommending at least one of relocation of the smart mouse trap or modification of the plurality of lures to improve rodent capture effectiveness; and a graphical user interface coupled to the mobile application and configured to display an alert to a user when at least one of the rodents are in close proximity to the smart mouse trap and to display eradication recommendations based on the results for allowing a user to mitigate infestation of the rodents and to prevent other rodents within the location, wherein the graphical user interface is further configured to display a map showing the location associated with the at least one QR code identifier; and wherein the plurality of sensors includes a plurality of biohazard detection sensors configured to detect pathogens and volatile gases associated with the rodents.

9. The system for controlling infestation of rodents with a smart mouse trap of claim 8, further comprising a processor coupled to the remote server configured to generate a map of the QR code identified locations of the smart mouse trap, the plurality of sensors, and image capture devices for display on the graphical user interface.

10. The system for controlling infestation of rodents with a smart mouse trap of claim 8, wherein at least one sensor is configured to be placed separately from the smart mouse trap at suspected locations of rodent entrances to determine if those are trafficked by the rodents.

11. The system for controlling infestation of rodents with a smart mouse trap of claim 8, wherein the mobile application is further configured to generate reports detailing an effectiveness of the location of the smart mouse trap, frequency of interactions between rodents and the rodent traps and to inform the user of predictive modeling on rodent activity patterns, and identify potential entry points of the rodents.

12. The system for controlling infestation of rodents with a smart mouse trap of claim 8, further comprising motion detection sensors with low light infrared sensors configured to detect movement in the surrounding area in low-light or nighttime conditions.

13. The system for controlling infestation of rodents with a smart mouse trap of claim 8, further comprising a plurality of sensors coupled to the mobile application and located at different locations and configured to detect environmental conditions at the different locations and assigned to at least one QR code identifier, the environmental conditions including humidity, elevation, and light intensity for relocation analysis.

14. The system for controlling infestation of rodents with a smart mouse trap of claim 8, further comprising at least one ultrasonic sound sensor configured to detect sounds of the rodents and an ultrasonic transmitter configured to broadcast rodent ultrasonic vocalizations (USVs) from a rodent trap to attract rodents, the ultrasonic transmitter being further configured to broadcast ultrasonic mimicry of rodent feeding-associated signals.

15. A system for controlling infestation of rodents with a smart mouse trap, comprising:

a plurality of lures for the rodents including a feed scent pad coupled to a refillable scent bottle and configured to receive liquid scents from the refillable scent bottle for continuous replenishment of the scent pad and an ultrasonic transmitter configured to broadcast food-associated rodent ultrasonic vocalizations to attract the rodents;

a motion detector coupled to a camera and coupled to a remote server configured to activate the camera to capture images when the motion detector detects the presence of the rodents in close proximity to the smart mouse trap, wherein the camera transmits the captured images to a remote server and wherein the motion detector is further configured to transmit data, including the date and time of detection, to the remote server;

a thermal imaging device attached to the smart mouse trap configured to capture thermal images of the rodents in close proximity to the smart mouse trap and to transmit the captured thermal images to the remote server, wherein the thermal imaging device is a thermal imaging camera configured to detect infrared radiating heat from the rodents and convert the infrared radiating heat into a visible image of the rodents to identify the rodents based on their heat signatures near the smart mouse trap to allow the tracking of the movements of the rodents and their behavior in low-light conditions;

a plurality of biohazard sensors coupled to the mobile application and located at different locations and configured to detect biohazard substances from droppings of the rodents at the different locations and assigned to at least one QR code identifier;

a mobile application operating on a mobile device having an image capture device and coupled to the remote server, wherein the image capture device is configured to scan at least one QR code identifier to determine a location of an area of the smart mouse trap, wherein a GPS chip integrated into the mobile device receives and records the GPS coordinates of the QR code identified location;

a plurality of sensors coupled to the mobile application and located at different locations and configured to detect environmental conditions and record behaviors of the rodents at the different locations and assigned to at least one QR code identifier, wherein the remote server uses the recorded behaviors and the captured images to calculate discovered behavioral patterns of the rodents;

a pattern recognition processor coupled to the remote server configured to receive the captured images and the sensor data from the smart mouse trap in relation to the plurality of lures to analyze and compare the discovered behavioral patterns of the rodents captured images to known rodent behavior patterns for generating results that identify matching patterns with insights into rodent habits and interactions near the smart mouse trap location, including feeding responses at the feed scent pad, the ultrasonic vocalizations and movement paths around the trap, wherein the pattern recognition processor is further configured to generate insights into rodent habits and interactions with the plurality of lures for recommending at least one of relocation of the smart mouse trap or modification of the plurality of lures to improve rodent capture effectiveness; and a graphical user interface coupled to the mobile application and configured to display an alert to a user when at least one of the rodents are in close proximity to the smart mouse trap and to display eradication recommendations based on the results for allowing a user to mitigate infestation of the rodents and to prevent other rodents within the location, wherein the graphical user interface is further configured to display a map showing the location associated with the at least one QR code identifier; and wherein the plurality of sensors includes a plurality of biohazard detection sensors configured to detect pathogens and volatile gases associated with the rodents.

16. The system for controlling infestation of rodents with a smart mouse trap of claim 15, further comprising a processor coupled to the remote server configured to generate a map of the QR code identified locations of the smart mouse trap, the plurality of sensors, and image capture devices for display on the graphical user interface.

17. The system for controlling infestation of rodents with a smart mouse trap of claim 15, wherein at least one sensor is configured to be placed separately from the smart mouse trap at suspected locations of rodent entrances to determine if those are trafficked by the rodents.

18. The system for controlling infestation of rodents with a smart mouse trap of claim 15, wherein the mobile application is further configured to generate reports detailing an effectiveness of the location of the smart mouse trap, frequency of interactions between rodents and the rodent traps and to inform the user of predictive modeling on rodent activity patterns, and identify potential entry points of the rodents.

19. The system for controlling infestation of rodents with a smart mouse trap of claim 15, further comprising motion detection sensors with low light infrared sensors configured to detect movement in the surrounding area in low-light or nighttime conditions.

20. The system for controlling infestation of rodents with a smart mouse trap of claim 15, further comprising at least one ultrasonic sound sensor configured to detect sounds of the rodents and an ultrasonic transmitter configured to broadcast rodent ultrasonic vocalizations (USVs) from a rodent trap to attract rodents, the ultrasonic transmitter being configured to mimic food-associated ultrasonic signals of rodents to increase capture rates.

* * * * *